May 29, 1956  H. MAYNARD  2,747,754
TRUCK MOUNTED HOIST
Filed Sept. 13, 1954  3 Sheets-Sheet 1
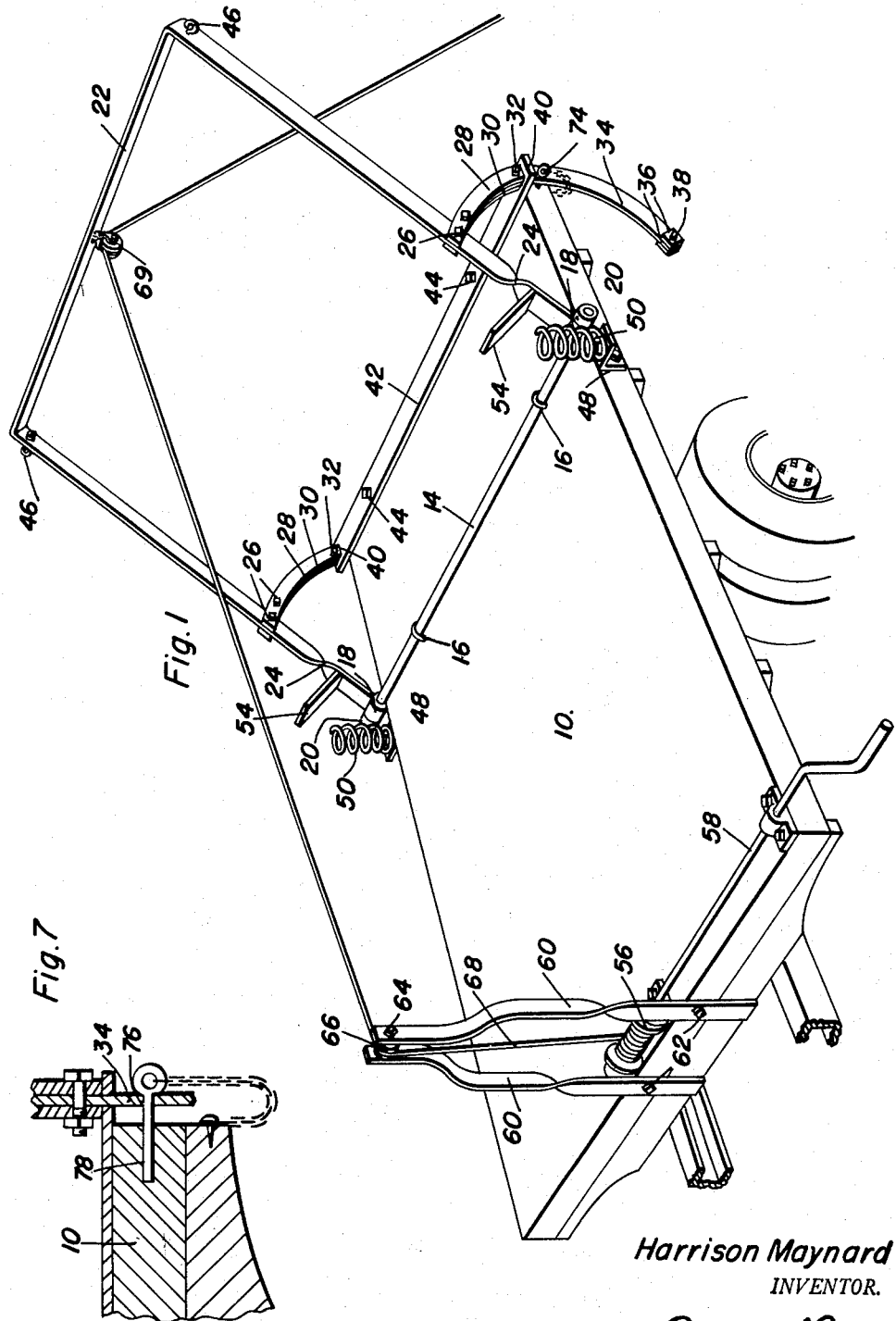
Harrison Maynard
INVENTOR.
BY May 29, 1956  H. MAYNARD  2,747,754
TRUCK MOUNTED HOIST
Filed Sept. 13, 1954  3 Sheets-Sheet 2
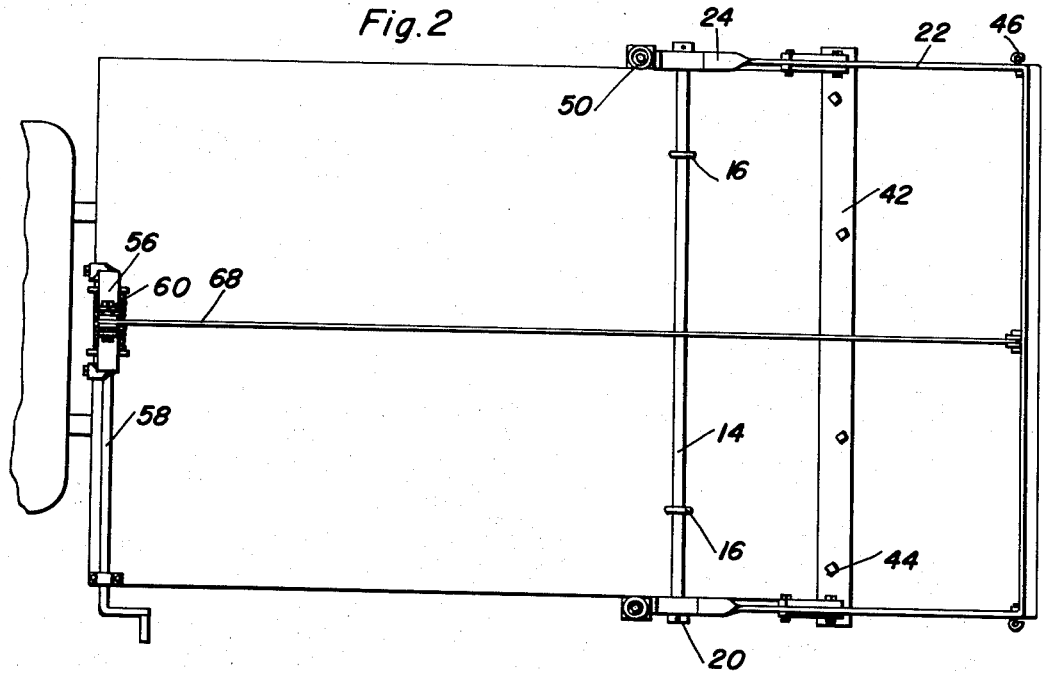
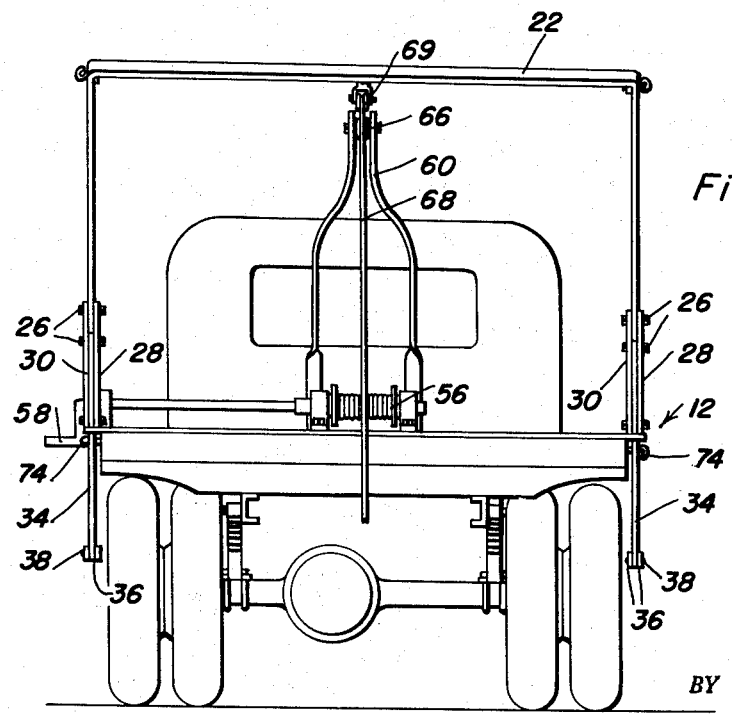
Harrison Maynard
INVENTOR.

May 29, 1956 — H. MAYNARD — 2,747,754
TRUCK MOUNTED HOIST
Filed Sept. 13, 1954 — 3 Sheets-Sheet 3
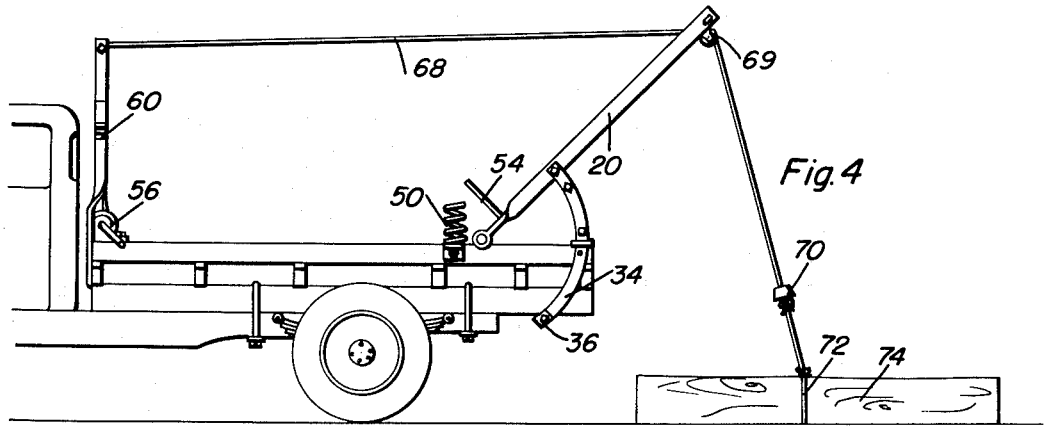
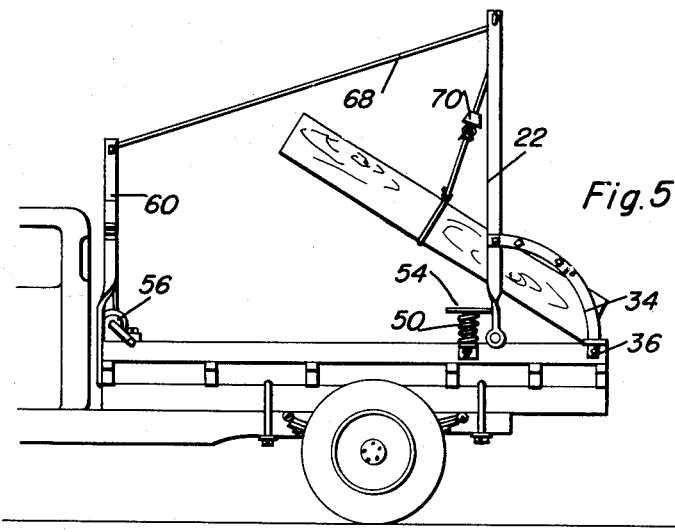
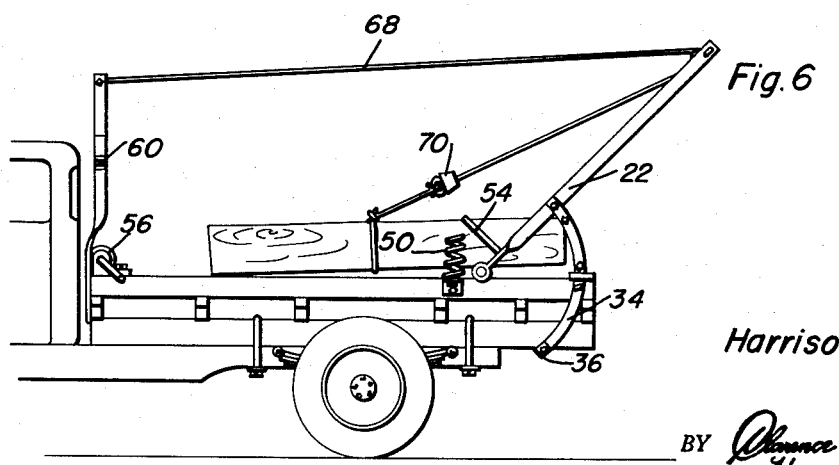
Harrison Maynard
INVENTOR.

United States Patent Office 2,747,754
Patented May 29, 1956

2,747,754

TRUCK MOUNTED HOIST

Harrison Maynard, Williamson, W. Va., assignor of one-half to Clarice Maynard, Williamson, W. Va.

Application September 13, 1954, Serial No. 455,729

1 Claim. (Cl. 214—523)

This invention relates to a hoist adapted to be mounted on a truck body and has for its particular object the provision of means for hoisting various articles such as logs and the like in a convenient and simple manner.

A further object of the invention resides in the provision of a hoist which has means incorporated therein for enabling a log to be readily lifted off of the ground and swung inwardly onto a truck bed.

The construction of this invention features a substantially U-shaped frame member which is rotatably mounted relative to a truck bed and which carries means for limiting the movement thereof. There is also provided resilient means for kicking the U-shaped frame member backward by storing up energy delivered from a winch after the load has been deposited on the truck bed.

Still further objects and features of this invention reside in the provision of a hoist that is strong and durable, simple in construction and installation on various types of vehicles, which is highly efficient in operation, and which is relatively inexpensive to manufacture thereby permitting wide distribution and utilization.

These, together with the various ancillary objects and features of the invention which will become apparent as the following description proceeds, are attained by this hoist, a preferred embodiment of which has been illustrated in the accompanying drawings, by way of example only, wherein:

Figure 1 is a perspective view of the hoist comprising the present invention as operatively installed on a truck bed;

Figure 2 is a top plan view of the hoist;

Figure 3 is a rear elevational view illustrating the hoist as installed on a vehicle;

Figures 4 through 6 are side elevational views illustrating the successive steps of operation of the hoist; and Figure 7 is a sectional detailed view illustrating the construction of the means for locking the U-shaped frame member in an operative position.

With continuing reference to the accompanying drawings wherein like reference numerals designate similar parts throughout the various views, reference numeral 10 designates a truck bed provided on the vehicle 12 on which the hoist comprising the present invention is adapted to be installed.

The hoist includes a transverse shaft 14 which is held by U shackles or bolts 16 to the truck bed 10 or which may be secured thereon by any other suitable means. Rotatably mounted by means of bearing rings as at 18 and held in place by collars 20 on either end of the shaft 14 is a substantially U-shaped frame member 22 having twisted portions as at 24 for enabling the installation of the frame member 22 on the shaft 14. By means of bolts as indicated at 26, a pair of arcuate guide support members as at 28 and 30 are attached to each of the legs of the frame member 22 and bolts 32 are utilized to attach arcuate guides 34 to the guide supports 28 and 30 and are received therebetween. Stop plates as at 36 are bolted by means of bolts 38 or otherwise secured to the lower end of the arcuate guides 34.

The arcuate guides 34 pass through slots as at 40 in an end plate 42 which is bolted as at 44 or otherwise secured to the end of the truck bed 10. The guides 34 provide lateral and transverse stability for the U-shaped frame member 22 while also providing means for limiting the relative movement of the frame member 22 and the truck bed 10. When in use to further increase the stability of the frame member 22, guy wires may be attached to eye bolts or like fittings as are indicated at 46. These guy wires may then be attached to external support structures as may be desired and if found necessary.

Secured to the truck bed 10 are a pair of substantially L-shaped brackets 48 which have coil springs as at 50 suitably attached thereto. The coil springs 50 are adapted to engage stop plates 54 welded or otherwise secured to and extending at a suitable angle relative to the frame member 22. Thus, when the frame member 22 is pivoted to an upright position, the stop plates 54 will engage and compress these springs 50.

Mounted on the truck bed 10 is a winch 56 which may be operated by means of a crank rod 58 or which may be power operated as may be desired. A pair of support members as at 60 are secured by means of bolts as at 62 to the truck bed 10 and carry therebetween a bolt forming a shaft as at 64 on which a pulley 66 is rotatably mounted. The hoisting line 68 which is wound upon the drum of the winch 56 is entrained about the pulley 66 as well as about a pulley 69 depending from the upper cross member of the U-shaped frame member 22.

In use, the hoisting line 68 is provided with a stop block 70 attached adjacent the end as at 72 which is secured to the load 74 such as a log or the like. Then, with the pin 75 which extends through as is best seen in Figure 7 an aperture 76 in one of the arcuate guides 34 and into a recess as at 78 in the truck bed 10 alternately with the pin 75 removed, the winch 56 may be actuated to draw the hoisting line 68 inward and thus raise the load 74. Concurrently with the raising of the load 74 and especially when the stop block 70 abuts against the pulley 69, the U-shaped frame member 22 will be pivoted to an upright position as is shown in Figure 5 from the position as is shown in Figure 4. Then, when the ends of the load 74 strike the bed, the winch may be released allowing the load to fall on the truck bed 10 and the compressed springs 50 will be off of the energy stored therein to pivot the U-shaped member outwardly to a position ready for loading the next log or other article being loaded. It is to be recognized that as the hoist loads the logs and the like onto the truck bed 10, it raises the article in such manner that the logs or the like may be readily stacked in a convenient manner.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A hoist for use in combination with a truck bed comprising a mounting shaft secured to said truck bed and extending transversely relative thereto, a substantially U-shaped frame member rotatably mounted on said shaft, a pulley carried by said frame member and having a hoisting line entrained therearound, winch means for operating said hoisting line, an end plate secured to said truck bed and having guide slots therein, arcuate guides receivable in said slots and having stop means thereon engageable with said end plate, said guide being attached to said U-shaped member, said winch means including a winch mounted on said truck bed, and an upwardly extending support carrying another pulley on which said hoisting line is engaged, a pair of support brackets secured to said truck bed, springs mounted on said brackets, and stop plates secured to said frame member engageable with said springs, and means engaging said guides and said truck bed for locking said frame member in a secured position.

References Cited in the file of this patent

UNITED STATES PATENTS

| | | |
|---|---|---|
| 80,654 | Mosher | Aug. 4, 1868 |
| 538,186 | Widdows | Apr. 23, 1895 |
| 893,491 | Hansen | July 14, 1908 |
| 1,378,631 | Stone | May 17, 1921 |
| 1,909,689 | Kuchar | May 16, 1933 |
| 2,245,853 | Eagleson | June 17, 1941 |
| 2,411,821 | Choat | Nov. 26, 1946 |
| 2,426,889 | Le Tourneau | Sept. 2, 1947 |
| 2,433,598 | Chadwick | Dec. 30, 1947 |
| 2,581,087 | Eakin | Jan. 1, 1952 |